United States Patent
Meyer

(10) Patent No.: US 10,161,488 B1
(45) Date of Patent: Dec. 25, 2018

(54) PULLEY APPARATUSES AND CABLE RETENTION DEVICES

(71) Applicant: Brunswick Corporation, Lake Forest, IL (US)

(72) Inventor: Mathew R. Meyer, Hanover, MN (US)

(73) Assignee: Brunswick Corporation, Mettawa, IL (US)

( * ) Notice: Subject to any disclaimer, the term of this patent is extended or adjusted under 35 U.S.C. 154(b) by 432 days.

(21) Appl. No.: 14/943,449

(22) Filed: Nov. 17, 2015

(51) Int. Cl.
F16H 7/18 (2006.01)
F16H 55/36 (2006.01)

(52) U.S. Cl.
CPC .............. *F16H 7/18* (2013.01); *F16H 55/36* (2013.01); *F16H 2055/363* (2013.01)

(58) Field of Classification Search
CPC ...... F16H 7/18; F16H 55/36; F16H 2055/363; F16H 55/52; A63B 21/154; A63B 21/155; A63B 21/156; B66D 2700/026
USPC ......................................... 474/151, 179, 184
See application file for complete search history.

(56) References Cited

U.S. PATENT DOCUMENTS

| | | | | |
|---|---|---|---|---|
| 244,976 A * | 8/1881 | Bilby, Jr. | ................. | F16H 55/50 384/127 |
| 333,947 A * | 1/1886 | Houghtaling | ............. | F16H 7/24 474/130 |
| 516,268 A * | 3/1894 | Hartz | ..................... | B66D 3/046 254/405 |
| 1,535,114 A * | 4/1925 | Edmunds | ................. | B63H 1/34 474/151 |
| 1,975,940 A * | 10/1934 | Harding | .................... | B66D 3/04 254/398 |
| 2,343,054 A * | 2/1944 | Gwinn, Jr. | ................ | F16H 7/20 254/415 |
| 2,363,353 A * | 11/1944 | Parker | ....................... | F16H 7/18 254/390 |
| 2,770,142 A * | 11/1956 | Margrey | .................... | F16H 7/20 474/151 |
| 2,946,559 A * | 7/1960 | Pickett | .................... | B65H 57/14 254/134.3 PA |
| 5,433,254 A * | 7/1995 | Pages | ........................ | F16H 7/18 139/82 |
| 5,951,444 A | 9/1999 | Webber | | |
| 6,527,683 B2 | 3/2003 | Tolles | | |
| 7,517,304 B1 | 4/2009 | Swanson et al. | | |
| 7,717,833 B1 | 5/2010 | Nelson et al. | | |
| 2014/0121052 A1 * | 5/2014 | Jaeger | ...................... | F16H 7/18 474/198 |

* cited by examiner

Primary Examiner — Michael R Mansen
Assistant Examiner — Mark K Buse
(74) *Attorney, Agent, or Firm* — Andrus Intellectual Property Law, LLP

(57) ABSTRACT

A pulley apparatus includes a pulley wheel, support member, and retention member configured to prevent a cable from inadvertently entering gaps defined between the support member and the pulley wheel. The retention member extends inwardly from the support member towards the pulley wheel to overlap at least a portion of the gaps. A cable retention device includes the retention member and can extend inwardly from the support member and overlap at least a portion of the gap. The retention member can include a sloped surface for funneling the cable toward the pulley wheel and a bottom surface to overlap the gap.

16 Claims, 5 Drawing Sheets

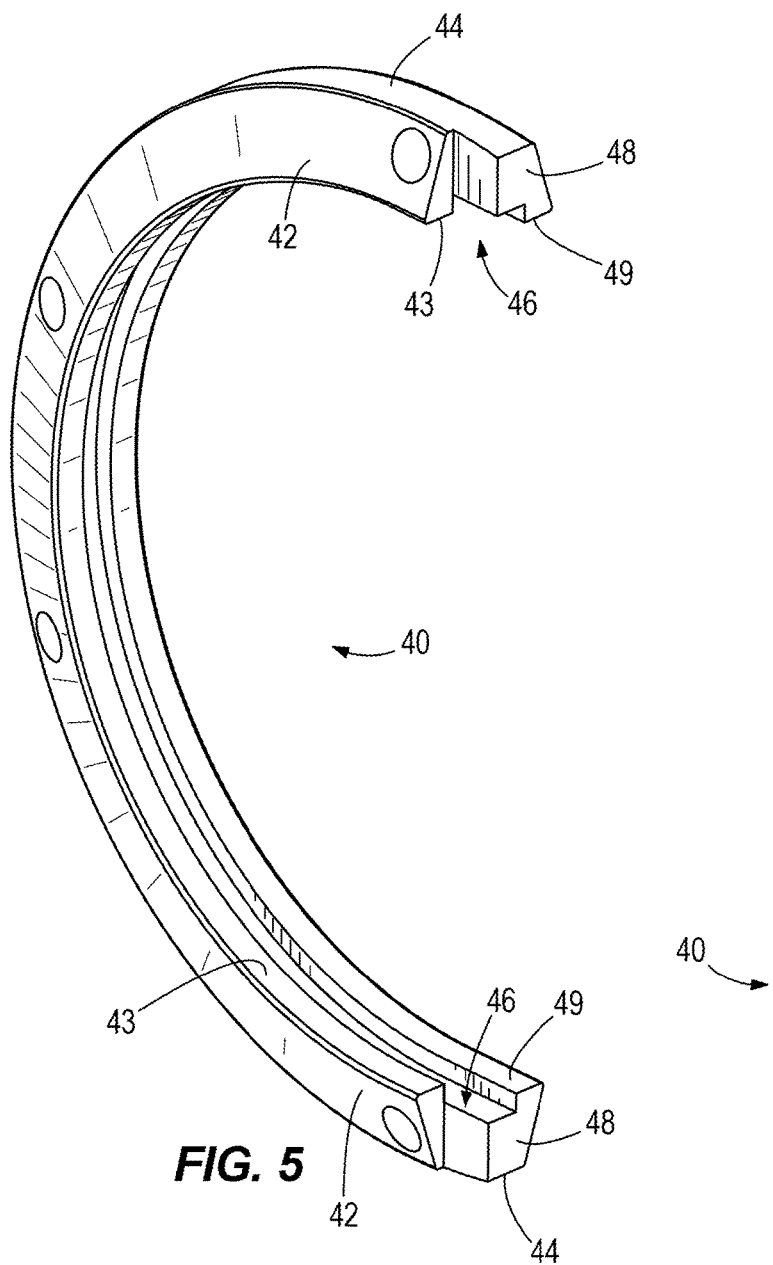
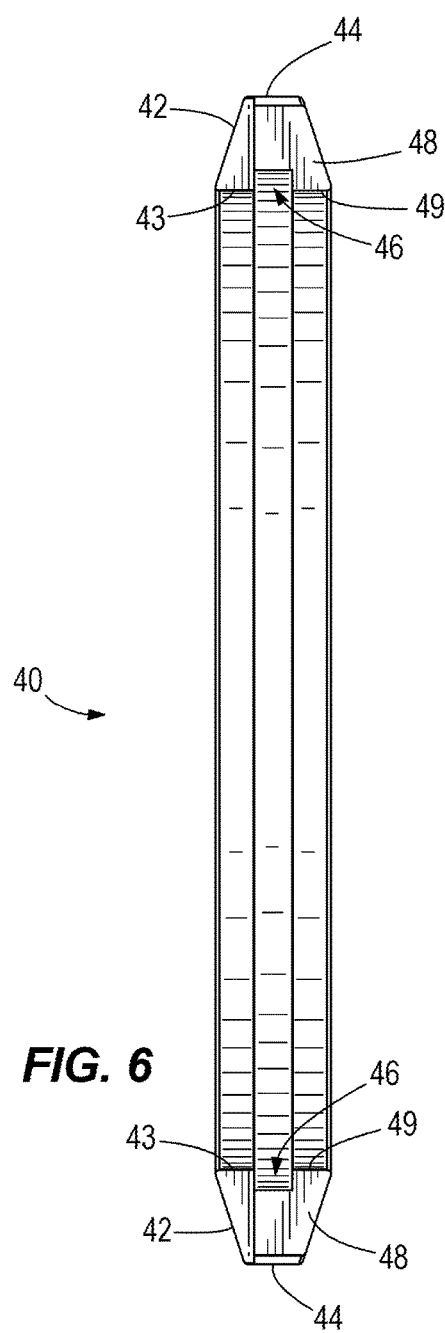
FIG. 5
FIG. 6

PULLEY APPARATUSES AND CABLE RETENTION DEVICES

FIELD

The present disclosure relates to pulley apparatuses and cable retention devices for use on machines, for example weight training machines.

BACKGROUND

The following patents are incorporated herein by reference in their entirety:

U.S. Pat. No. 6,527,683 discloses an exercise machine having a frame, weight stack, pulleys, and cables and incorporating a dual adjustable pulley system. The weight stack is slidably connected to the frame. A primary moveable pulley system is engaged with the weight stack by way of a primary cable. The primary cable has a handle connected to its first end and its second end is fixed with respect to an exercise movement. A series of directional pulleys are also engaged with the primary cable. The directional pulleys are positioned on the frame to allow for an exerciser to perform multiple exercises employing the weight stack. A secondary moveable pulley system is engaged with the primary moveable pulley system. The secondary moveable pulley system can be selectively engaged with the weight stack using a releasable coupler. A secondary cable is functionally engaged with the secondary moveable pulley system and a number of directional pulleys. The secondary cable has a first end that is fixed to a floating pulley. The floating pulley is functionally engaged with the primary cable. The secondary cable has second end that selectively engages the weight stack. The relationship between the primary moveable pulley system and the secondary moveable pulley system is such that when the handle is moved in an exercise motion, the weight stack provides resistance to the exercise motion.

U.S. Pat. No. 7,717,833 discloses adjustable exercise machines, apparatuses, and systems. The machines, apparatuses, and systems typically include an adjustable, reversible mechanism that utilizes pivoting arms and a floating pulley. The machines, apparatuses, and systems typically are configured for performing pushing and pulling exercises and may provide for converging and diverging motion.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one example, a pulley apparatus includes a pulley wheel, a support member, and retention members. The support member is disposed on opposite sides of the pulley wheel so that gaps are defined between the support member and the pulley wheel. The pulley wheel is rotatable with respect to the support member about an axis of rotation. The retention members extend inwardly from the support member towards the pulley wheel, and the retention members overlap at least a portion of the gaps with respect to the axis of rotation to prevent a pulley cable from inadvertently entering the gaps.

In another example, a cable retention device for a machine having a pulley wheel, support member, and pulley cable, includes a retention member configured to extend inwardly from the support member towards the pulley wheel and overlap at least a portion of a gap defined between the support member and the pulley wheel.

BRIEF DESCRIPTION OF THE DRAWINGS

Examples of pulley apparatuses and cable retention devices for weight training machines are described with reference to the following drawing figures. The same numbers are used throughout the figures to reference like features and components.

FIG. 5 is a perspective view of an example retention member.

FIG. 6 is an end view of the example retention member of FIG. 5.

DETAILED DESCRIPTION OF THE DRAWINGS

Figure 1:
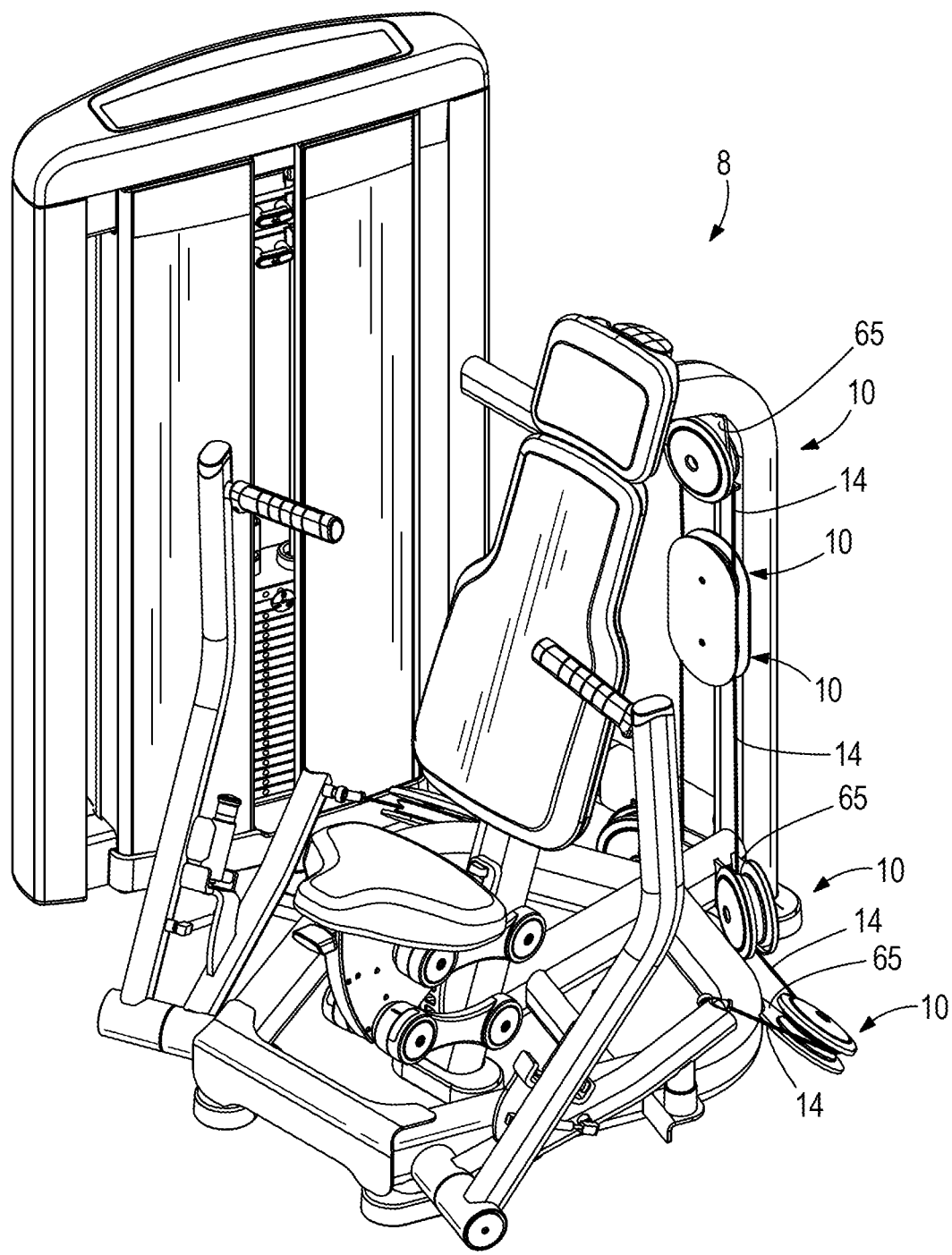
FIG. 1 is an example weight training machine.

An example weight training machine 8 having example pulley apparatuses 10 is depicted in FIG. 1.

Figure 2:
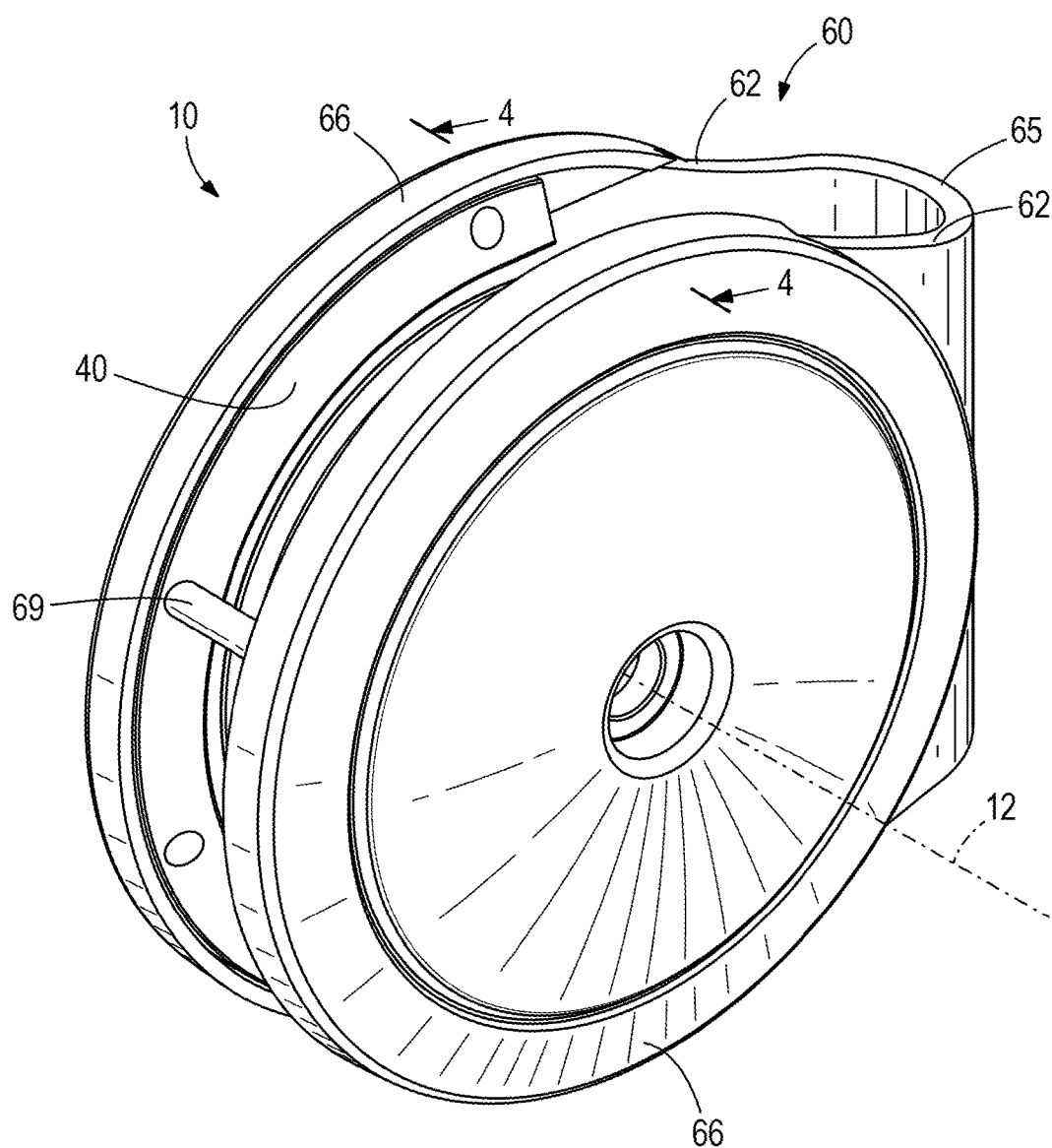
FIG. 2 is a perspective view of an example pulley apparatus.
Figure 3:
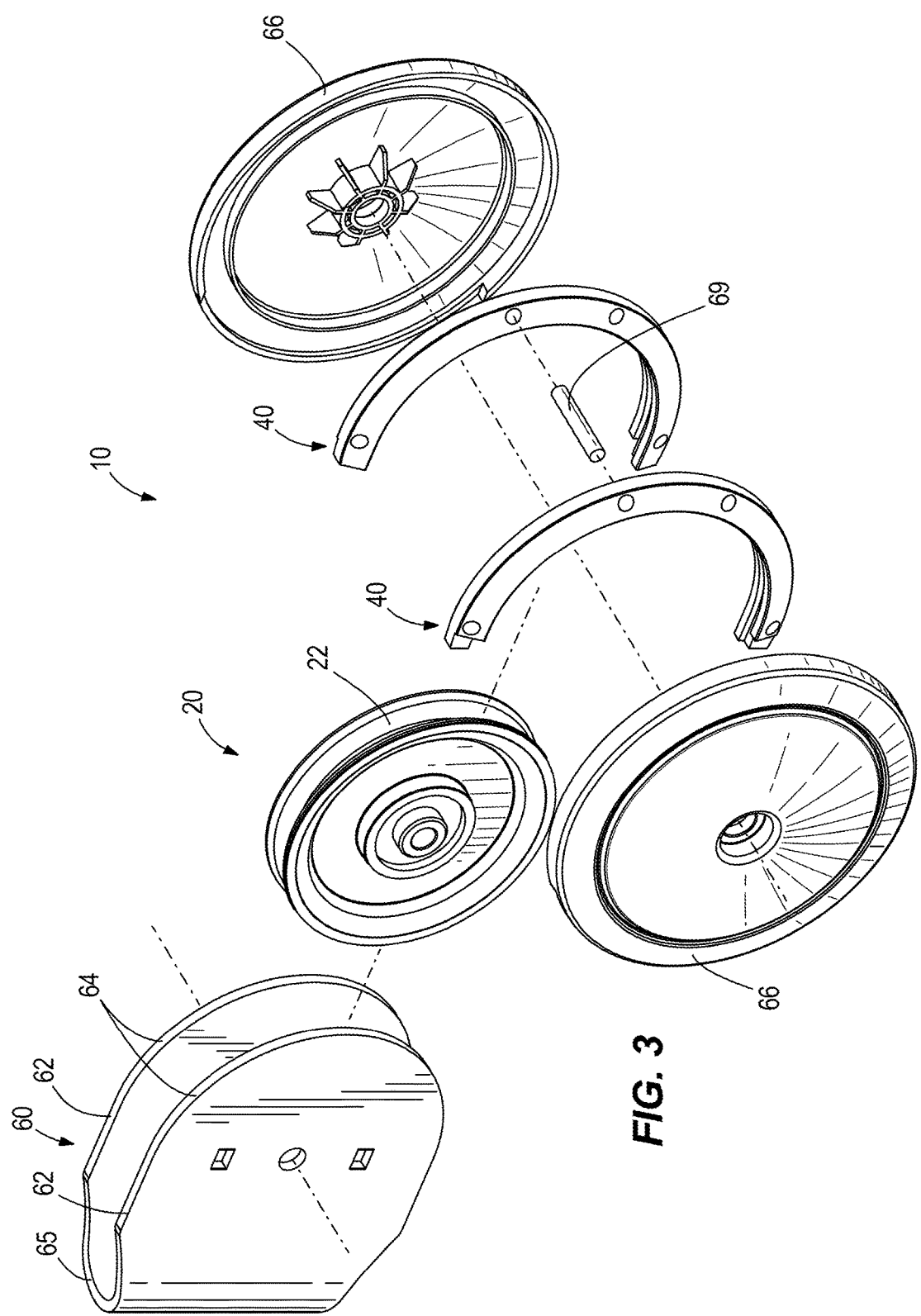
FIG. 3 is an exploded view of the example pulley apparatus of FIG. 2.
Figure 4:
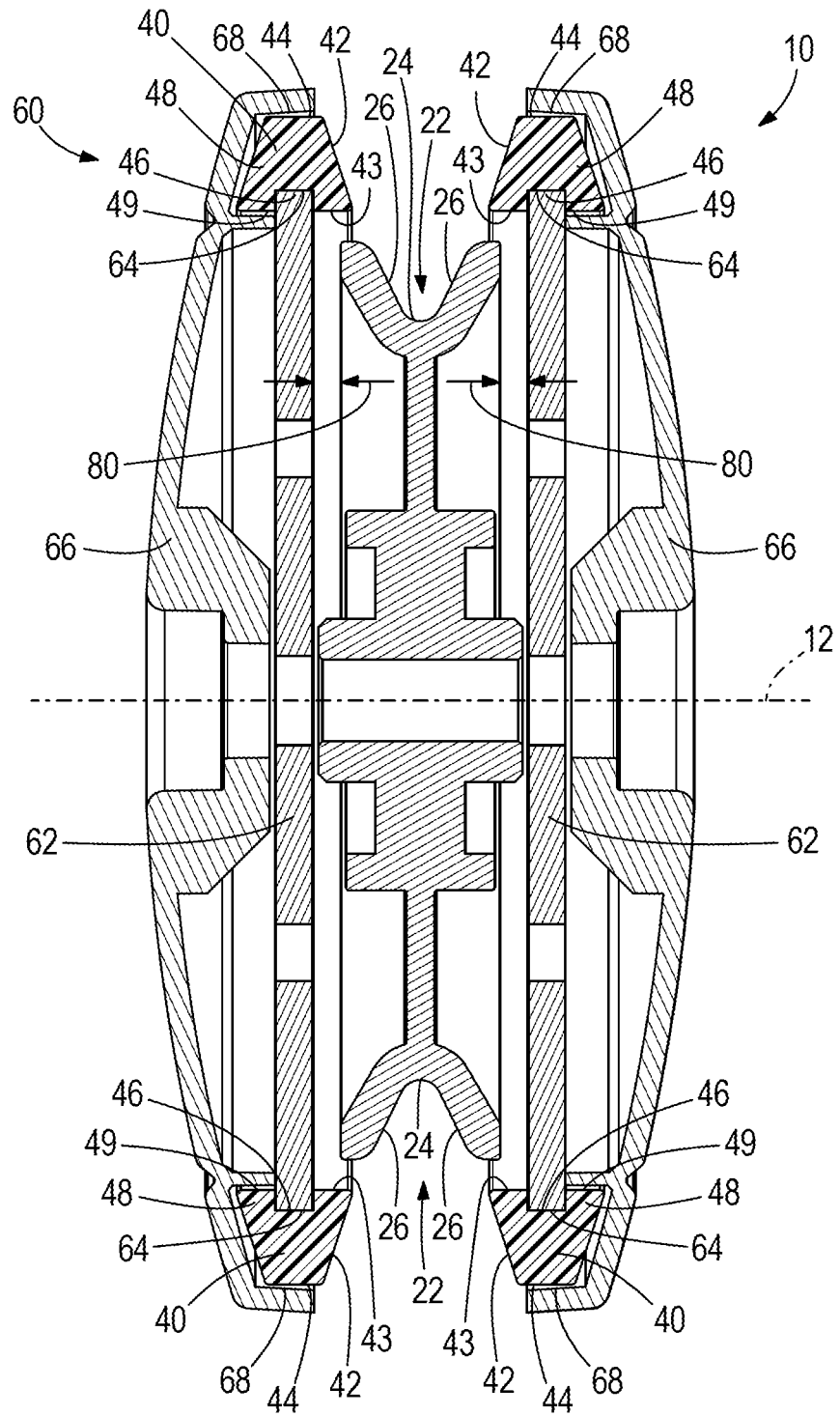
FIG. 4 is a cross section view of the example pulley apparatus of FIG. 2.

Referring to FIGS. 2-4, an example of the pulley apparatus 10 includes a pulley wheel 20, a support member 60, and retention members 40.

The pulley wheel 20 has a radially outer surface 22 and a groove 24. (see FIG. 4). The radially outer surface 22 contacts a pulley cable 14 installed onto the pulley wheel 20. (see FIGS. 1 and 4). The groove 24 receives and/or retains the pulley cable 14. The groove 24 has opposing sloped groove surfaces 26 sloping radially inwardly toward the center of the pulley wheel 20. The pulley wheel 20 can be made of any suitable material such as rubber, plastic, wood, metal, and/or the like.

The support member 60 is disposed on opposite sides of the pulley wheel 20 such that gaps 80 are defined between the support member 60 and the pulley wheel 20. (see FIGS. 3-4). The pulley wheel 20 is rotatable with respect to the support member 60 about an axis of rotation 12. The support member 60 can include opposing support brackets 62 and/or opposing covers 66. (see FIGS. 3-4). The opposing support brackets 62 include radially outer edges 64. (see FIG. 3). The opposing support brackets 62 can include a connection member 65 to connect the opposing support brackets 62 to a machine 8. (see FIGS. 1 and 3). The opposing covers 66 are disposed on the opposing support brackets 62, and the opposing covers 66 include radial inner flange surfaces 68. (see FIG. 4). The opposing covers 66 can be removably connected to the opposing support brackets 62 so that the user can perform maintenance on the opposing support brackets 62 and/or pulley wheel 20. The support member 60 includes a crossbar 69 to retain the pulley cable 14 adjacent to the pulley wheel 20. (see FIGS. 2-3). The opposing support brackets 62 and/or the opposing covers 66 can take any shape including circular, rectangular, and/or the like. The opposing support brackets 62 and/or the opposing covers 66 can be made of any suitable material such as rubber, plastic, wood, metal, and/or the like. In some examples, the opposing support brackets 62 and the opposing covers 66 are integral with each other.

Referring to FIGS. 3-4, the retention members 40 extend inwardly from the support member 60 towards the pulley wheel 20 and overlap at least a portion of the gaps 80 with respect to the axis of rotation 12, thereby advantageously preventing a pulley cable 14 from inadvertently entering the gaps 80. The shape of the retention member 40 can vary from that shown. In the illustrated example, the retention member 40 has sloped surface 42 connecting a bottom surface 43 to a top surface 44 and mounting groove 46.

The retention member 40 can be mounted between the opposing support brackets 62 and opposing covers 66, onto the opposing support brackets 62, or onto the opposing covers 66, (see FIGS. 2-4). In the non-limiting illustrated example, the retention member 40 is mounted onto the opposing support brackets 62 such that the mounting grooves 46 receive the radially outer edges 64 of the opposing support brackets 62. (see FIG. 4). The retention member 40 is disposed on and extends radially along the perimeter of the support member 60, such as the radially outer edges 64.

Referring to FIG. 4, the bottom surface 43 of the retention member 40 projects inwardly towards the pulley wheel 20 such that the bottom surface 43 overlaps the gap 80 with respect to the axis of rotation 12. The sloped surfaces 42 funnels the pulley cable 14 towards the radially outer surface 22 when the pulley cable 14 is installed onto the pulley apparatus 10. In one example, the sloped surfaces 42 are substantially aligned with the opposed sloped groove surfaces 26 of the pulley wheel 20 such that the sloped surfaces 42 and the opposed sloped groove surfaces 26 cooperate together to funnel the pulley cable 14 onto the outer surface 22 of the pulley wheel 20 when the pulley cable 14 is installed onto the pulley apparatus 10.

The top surface 44 of the retention member 40 abuts the radial inner flange surfaces 68 of the opposing covers 66 so that the retention member 40 is mounted between the opposing covers 66 and the opposing support brackets 62. (see FIG. 4). The retention member 40 can include an alignment portion 48 configured to align the retention member 40 on the support member and/or radially outer edges 64. The alignment portion 48 extends radially outward of the support member 60 and axially toward the axis of rotation 12. The alignment portion 48 includes a bottom surface 49 that is parallel with the bottom surface 43 of the retention member 40. (see FIG. 6).

The shape of the retention member 40 can vary from that shown and can be curved, C-shaped, circular, and/or the like. (see e.g. FIG. 5). The retention member 40 can extend partially or entirely around the circumference of the pulley wheel 20. The retention member 40 can be made of any suitable material such as plastic, metal, rubber, wood, and/or the like.

In the present description, certain terms have been used for brevity, clearness and understanding. No unnecessary imitations are to be implied therefrom beyond the requirement of the prior art because such terms are used for descriptive purposes only and are intended to be broadly construed. The different apparatuses and devices described herein may be used alone or in combination with other apparatuses and devices. Various equivalents, alternatives and modifications are possible within the scope of the appended claims.

What is claimed is:

1. A pulley apparatus comprising:
   a pulley wheel;
   a support member disposed on opposite sides of the pulley wheel so that gaps are defined between the support member and the pulley wheel, wherein the pulley wheel is rotatable with respect to the support member about an axis of rotation; and
   retention members that extend inwardly from the support member towards the pulley wheel, wherein the retention members overlap at least a portion of the gaps with respect to the axis of rotation to thereby prevent a pulley cable from inadvertently entering the gaps;
   wherein the pulley wheel comprises a radially outer surface and the retention members each comprise a sloped surface that axially overlaps the radially outer surface and funnels the pulley cable towards the radially outer surface when the pulley cable is installed onto the pulley apparatus.

2. The pulley apparatus according to claim 1, wherein the retention members are attached to the support member.

3. The pulley apparatus according to claim 1, wherein the retention members each have a bottom surface projecting inwardly towards the pulley wheel, wherein the bottom surface overlaps the gap with respect to the axis of rotation.

4. The pulley apparatus according to claim 1, wherein the radially outer surface has a groove that is configured to receive and retain the pulley cable.

5. The pulley apparatus according to claim 1, wherein the support member comprises opposing support brackets and opposing covers that are disposed on the opposing support brackets.

6. The pulley apparatus according to claim 5, wherein the retention members are mounted between the opposing covers and the opposing support brackets.

7. The pulley apparatus according to claim 1, wherein the retention members extend only partially around a circumference of the pulley wheel.

8. A pulley apparatus comprising:
   a pulley wheel;
   a support member disposed on opposite sides of the pulley wheel so that gaps are defined between the support member and the pulley wheel, wherein the pulley wheel is rotatable with respect to the support member about an axis of rotation; and
   retention members that extend inwardly from the support member towards the pulley wheel, wherein the retention members overlap at least a portion of the gaps with respect to the axis of rotation to thereby prevent a pulley cable from inadvertently entering the gaps;
   wherein the pulley wheel comprises a radially outer surface and the retention members each comprise a sloped surface that funnels the pulley cable towards the radially outer surface when the pulley cable is installed onto the pulley apparatus;
   wherein the radially outer surface has a groove that is configured to receive and retain the pulley cable; and
   wherein the groove has opposing sloped groove surfaces and wherein the sloped surfaces of the retention members are substantially aligned with the opposed sloped groove surfaces so that the sloped surfaces of the retention members and the opposed sloped groove surfaces together funnel the pulley cable onto the outer surface of the pulley wheel when the pulley cable is installed onto the pulley apparatus.

9. A pulley apparatus comprising:
   a pulley wheel;
   a support member disposed on opposite sides of the pulley wheel so that gaps are defined between the support member and the pulley wheel, wherein the pulley wheel is rotatable with respect to the support member about an axis of rotation; and retention members that extend inwardly from the support member towards the pulley wheel, wherein the retention members overlap at least a portion of the gaps with respect to the axis of rotation to thereby prevent a pulley cable from inadvertently entering the gaps;

wherein the support member comprises opposing support brackets and opposing covers that are disposed on the opposing support brackets;

wherein the retention members are mounted between the opposing covers and the opposing support brackets; and wherein the opposing support brackets comprise radially outer edges, and wherein the retention members comprise mounting grooves that receive the radially outer edges of the opposing support brackets to thereby mount the retention members onto the opposing support brackets.

10. The pulley apparatus according to claim 9, wherein the opposing covers comprise radially inner flange surfaces, and wherein the retention members further comprise top surfaces that abut the radially inner flange surfaces of the opposing covers to thereby mount the retention members are mounted between the opposing covers and the opposing support brackets.

11. A pulley apparatus for an exercise machine, the pulley apparatus comprising:
a pulley wheel, a support member, and a pulley cable,
a retention member configured to extend inwardly from the support member towards the pulley wheel and overlap at least a portion of a gap defined between the support member and the pulley wheel;
wherein the retention member includes a bottom surface configured to project inwardly toward the pulley wheel;
wherein the retention member includes a sloped surface that funnels the pulley cable towards a radially outer surface of the pulley wheel when the pulley cable is installed on the pulley wheel; and
wherein the sloped surface is aligned with a sloped groove surface of the pulley wheel.

12. The pulley apparatus according to claim 11, wherein the retention member extends radially along a perimeter of the support member.

13. The pulley apparatus according to claim 12, wherein the retention member is C-shaped.

14. A pulley apparatus for an exercise machine, the pulley apparatus comprising:
a pulley wheel, a support member, and a pulley cable;
a retention member configured to extend inwardly from the support member towards the pulley wheel and overlap at least a portion of a gap defined between the support member and the pulley wheel;
wherein the retention member includes a bottom surface configured to project inwardly toward the pulley wheel;
wherein the retention member includes a sloped surface that funnels the pulley cable towards a radially outer surface of the pulley wheel when the pulley cable is installed on the pulley wheel; and
wherein the support member comprises opposing support brackets;
wherein the sloped surface is aligned with a sloped groove surface of the pulley wheel and
wherein the retention member includes a mounting groove in which a radially outer edge of the support bracket is disposed.

15. The cable retention device of claim 14, wherein the retention member includes an alignment portion configured to align the retention member on the support member.

16. The cable retention device of claim 15, wherein the alignment portion has a bottom surface that is parallel with the bottom surface of the retention member.

* * * * *